United States Patent
Sakai et al.

[11] 3,925,451
[45] Dec. 9, 1975

[54] 13,14ξ-METHYLENE-15-OXOPROSTANOIC ACID DERIVATIVES

[75] Inventors: Kiyoshi Sakai; Kenji Inoue; Yawara Tajima; Mitsuo Yamazaki; Kazuo Ohuchi; Takashi Yusa, all of Tokyo, Japan

[73] Assignee: Sankyo Company Limited, Tokyo, Japan

[22] Filed: May 15, 1974

[21] Appl. No.: 470,050

[30] Foreign Application Priority Data
June 2, 1973 Japan.................... 48-62122

[52] U.S. Cl...... 260/468 D; 260/410.9 R; 260/413; 260/514 D; 124/305; 124/317
[51] Int. Cl.²................ C07C 61/38; C07C/69/74
[58] Field of Search................ 260/514 D, 468 D

[56] References Cited
UNITED STATES PATENTS
3,808,259   4/1974   Sukai et al................. 260/468
3,842,117  10/1974   Sukai et al................. 260/468

OTHER PUBLICATIONS
Fieren et al., Reagents for Organic Synthesis, Vol. II, p. 74, (1969).

Primary Examiner—Robert Gerstl
Attorney, Agent, or Firm—Flynn & Frishauf

[57] ABSTRACT

13,14ξ-Methylene-15-oxoprostanoic acid derivative having the formula

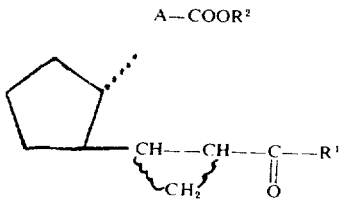

wherein A represents a straight or branched alkylene group having from 4 to 8 carbon atoms, $R^1$ represents a straight or branched alkyl group having from 4 to 10 carbon atoms and $R^2$ represents hydrogen atom or a straight or branched alkyl group having from one to 6 carbon atoms and pharmaceutically acceptable salts thereof.

The compounds are useful as an inhibitor of prostaglandin-15-OH dehydrogenase and an increasing agent of a prostaglandin activity and prepared by oxidizing a compound having the formula

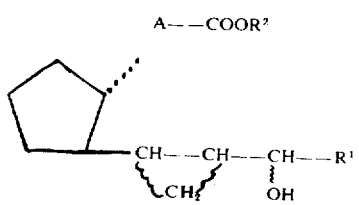

wherein A, $R^1$ and $R^2$ are the same as above and, if desired, salifying the product thus obtained.

5 Claims, No Drawings

13,14 ξ-METHYLENE-15-OXOPROSTANOIC ACID DERIVATIVES

This invention relates to novel prostanoic acid derivatives and a novel process for the preparation thereof.

More particularly, it relates to 13,14 ξ -methylene-15-oxoprostanoic acid derivatives having the formula

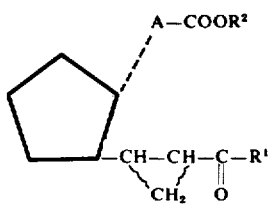

(I)

wherein A represents a straight or branched alkylene group having from 4 to 8 carbon atoms, R¹ represents a straight or branched alkyl group having from 4 to 10 carbon atoms and R² represents hydrogen atom or a straight or branched alkyl group having from one to 6 carbom atoms and pharmaceutically acceptable salts thereof and also relates to a process for the preparation thereof.

In the above formula (I), A may be a straight or branched alkylene group having from 4 to 8 carbon atoms, preferably, tetramethylene, pentamethylene, hexamethylene, heptamethylene, octamethylene, 4-methylhexamethylene, 4,4-dimethylhexamethylene, 5-methylhexamethylene and 4-methylheptamethylene, R¹ may be a straight or branched alkyl group having from 4 to 10 carbon atoms, preferably, n-butyl, isobutyl, n-pentyl, isopentyl, 1-methylpentyl, 2-methylpentyl, 1,1-dimethylpentyl, 1,2-dimethylpentyl, n-hexyl, isohexyl, 1-methylhexyl, 1,1-dimethylhexyl, 1,2-dimethylhexyl, n-heptyl, n-octyl and n-decyl. R² may be hydrogen atom or a straight or branched alkyl group having from one to 6 carbom atoms, preferably, methyl, ethyl, n-propyl, isopropyl, n-butyl, isobutyl, n-pentyl and n-hexyl. Preferred groups of the prostanoic acid derivatives provided by the invention are those of the formula (I) wherein A represents hexamethylene group, i.e., those having the formula

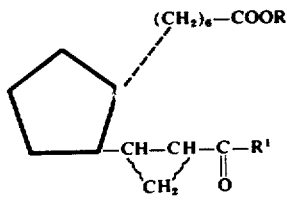

(I-a)

wherein R¹ and R² are the same as above and the pharmaceutically acceptable salts thereof.

In formulae (I) and (I-a), and elsewhere in this specification, a bond attached to the cyclopentane nucleus which is in the α-configuration, i.e., extends below the plane of the cyclopentane ring, is represented by a dotted line, and a bond which is in the β-configuration, i.e., extends above the plane of the cyclopentane ring, is represented by a solid line. The wavy line indicates that either steric configuration is possible. In the scope of this invention, optical isomers and racemic mixtures of the prostanoic acid derivatives having the formula (I) may be contained.

The pharmaceutically acceptable salts of the acids of formulae (I) and (I-a) in which R² is hydrogen atom include alkali end alkaline earth metal salts, e.g., the sodium, potassium, magnesium and calcium salts, quaternary ammonium salts e.g., the ammonium, tetramethylammonium, tetraethylammonium, benzyltrimethylammonium and phenyltriethylammonium salts, aliphatic, alicyclic or aromatic amine salts, e.g., the methylamine, ethylamine, dimethylamine, diethylamine, trimethylamine, triethylamine, N-methylhexylamine, cyclopentylamine, dicyclohexylamine, benzylamine, dibenzylamine, α-phenylethylamine and ethylenediamine salts, heterocyclic amine salts, e.g., the piperidine, morpholine, pyrrolidine, piperazine, pyridine, 1-methylpiperazine and 4-ethylmorpholine salts, salts of amines which are water-soluble or contain a hydrophilic group, e.g., the monoethanolamine, ethyldiethanolamine and 2-amino-2-butanol salts. Such salts may be prepared from the acids of formulae (I) and (I-a) in which R² is hydrogen atom by the conventional techniques.

The compound having the aforementioned general formula (I) prepared according to the process of the present invention, for instance, dl-13,14 α-methylene-15-oxoprostanoic acid or dl-13,14 β-methylene-15-oxoprostanoic acid, shows uncompetitive and strong inhibition against a prostaglandin-15-OH dehydrogenase which is an enzyme quickly inactivating known prostaglandins in vivo. The reaction was conducted at 45°C by the use of 500 ml of a reaction solution which comprises 28 μM of prostaglandin E₂, 1.2 mM of nicotine-adenine dinucleotide (oxidation type), 1.0 mM of dithiothreitol, 40 mM of a potassium phosphate buffer solution (pH 7.3), a prostaglandin-15-OH dehydrogenase obtained and purified from a lung of a pig and various concentrations of dl-13,14 α-methylene-15-oxoprostanoic acid or dl-13,14 β-methylene-15-oxoprostanoic acid. After 30 minutes the reaction was ceased by ice-cooling. Then 30 μl of a 2 N aqueous sodium hydroxide solution was added to the resulting solution so that the color of 15-ketoprostaglandin E₂ produced in the reaction was developed. The maximum value of the absorbance (OD₅₀₀nm) was measured, and the inhibition constant (Ki) was determined by means of Lineweaver-Burk plot. The dl-13,14 α-methylene-15-oxoprostanoic acid and dl-13,14 β-methylene-15-oxoprostanoic acid showed 0.8 μM and 0.14 μM respectively. Therefore, when dl-13,14 α-methylene-15-oxoprostanoic acid or dl-13,14 β-methylene-15-oxoprostanoic acid is administered with known prostaglandins, the decomposition in vivo of the known prostaglandins administered is depressed. For this reason, these physiological effects, for instance, uterus contraction, blood pressure depression, control of secretion of gastric juice and control of aggregation of blood plate, can be strengthened, and active periods thereof can be prolonged. When administered to human beings, the administration is generally effected through parenteral procedures, for instance, intravenous injection. The present compounds may usually be dissolved with known prostaglandins in an isotonic sodium chloride solution and injected successively into a vein. A does for adult per day may generally vary depending upon the amount of the known prostaglandins to be mixed, but may be between about 10 mg and 100 mg.

According to the process of this invention, the compound having the aforementioned general formula (I) can be prepared by oxidizing the compound having the general formula

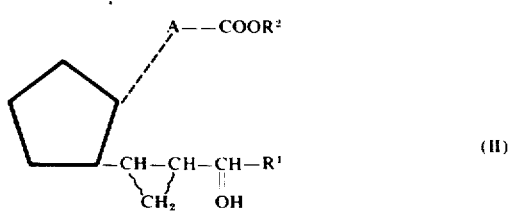

(II)

in which A, R¹ and R² have the same significance as defined above.

In practising the process of the present invention, the reaction may be carried out in the presence or absence of a solvent by the use of an oxidizing agent. The oxidizing agents to be employed may preferably be chromic acids such as chromic acid, chromic anhydride, a chromic anhydride-pyridine complex (Collins reagent), chromic anhydride-conc. sulfuric acid-water (Jones reagent), sodium bichromate and potassium bichromate, organic active halogen compounds such as N-bromoacetamide, N-bromosuccinimide, N-bromophthalimide, N-chloro-p-toluenesulfonamide and N-chlorobenzenesulfonamide; aluminum alkoxides such as aluminum tert-butoxide and aluminum isopropoxide, dimethylsulfoxide-dicyclohexylcarbodiimide, dimethylsulfoxide-acetic anhydride, dimethylsulfoxide-chlorine-triethylamine and the like. An excess amount of the oxidizing agents may usually be employed.

The solvents to be employed in the case of using a solvent are not limited so far as these are inert to the present reaction and are preferably organic acids or mixture of organic acids and organic acid anhydrides such as, acetic acid and acetic acid-acetic anhydride or halogenated hydrocarbons such as dichloromethane, chloroform and carbon tetrachloride in cases where chromic acids are employed. While, in cases where organic active halogen compounds are employed, aqueous organic solvents such as aqueous tert-butanol, aqueous acetone and aqueous pyridine are preferred. In cases where aluminum alkoxides are employed, aromatic hydrocarbons such as benzene, toluene and xylene are preferred. In case where either dimethylsulfoxide-dicyclohexylcarbodiimide or dimethylsulfoxide-acetic anhydride is employed and an excess amount of the dimethylsulfoxide is used, no other solvents are generally needed. In cases where aluminum alkoxides are employed, excess amounts of hydrogen acceptors, for instance, ketones such as acetone, methyl ethyl ketone, cyclohexanone and benzoquinone are preferably used as well as the above-mentioned solvent. In carrying out this reaction, water should be completely expelled from the reaction system. In case where dimethylsulfoxide-dicyclohexylcarbodiimide is employed, such acids as phosphoric acid, acetic acid and the like are used in the catalytic amount in accordance with a conventional manner. In the present reaction, chromic acids, especially a chromic anhydride-pyridine complex (Collins reagent) and chromic anhydride-conc. sulfuric acid-water (Jones reagent), are employed as most preferred oxidizing agents.

The reaction temperature is not limited, but it is preferable to be relatively lower so as to avoid side reactions. The reaction may be usually performed at a temperature from −20°C to room temperature and preferably at a temperature from 0°C to room temperature. The reaction time may vary depending mainly upon the reaction temperature and the kind of oxidizing agents used and may be between about 10 minutes and 1 hour.

After completion of the reaction, the desired compound is taken out of the reaction mixture in a usual way. For example, it is obtained by adding an organic solvent such as ether to the reaction mixture after the reaction is completed, removing the insoluble materials, washing and drying the resulting organic layer and evaporating the solvent from the organic layer. The desired compound thus obtained may be further purified in a usual way, for example, column chromatography or thin layer chromatography, if required. The compounds having the formula (I) wherein R² is hydrogen atom may be alternatively obtained by hydrolyzing the compound having the formula (I) wherein R² is the alkyl group.

The reaction may be achieved by bringing the compound having the formula (I) wherein R² is the alkyl group into contact with an acid or base. The acid or the base to be employed is unlimited one which may be used in a conventional hydrolysis, and may preferably be, for instance, a mineral acid such as hydrochloric acid, sulfuric acid or hydrobromic acid or a hydroxide of an alkali metal or an alkaline earth metal such as sodium hydroxide, potassium hydroxide or barium hydroxide, a carbonic acid salt of an alkali metal or an alkaline earth metal such as sodium carbonate, potassium carbonate or calcium carbonate. In general, the reaction may be conveniently carried out under basic conditions. The reaction may be carried out in the presence or absence of a solvent. Yet, the use of a solvent is preferred in order to carry out the reaction smoothly. The solvents to be employed are not limited so far as these are inert to the reaction, and preferably are, for instance, water and mixtures of water with alcohols such as methanol and ethanol or with ethers such as tetrahydrofuran and dioxane. The reaction temperature is not specifically limited, but temperatures between room temperature and the reflux temperature may be preferred.

The compound having the aforementioned general formula (II) which is employed as a starting material is a novel compound, and may be obtained by ring-formation to three-membered ring of the double bond of the compound having the general formula

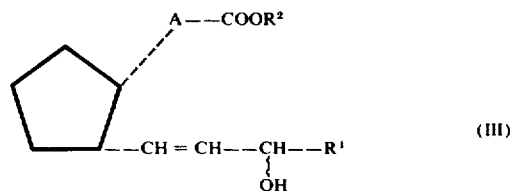

(III)

in which A, R¹ and R² have the same significance as defined above.

The reaction is carried out in the presence or absence of a solvent by bringing the compound (III) into contact with a reagent which is usually employed in the process of ring-formation to three-membered ring of a double bond. The reagents to be employed may be exemplified by zinc-containing metallic compound-methylene dihalide such as diethyl zinc-methylene iodide, zinc powder-copper chloride-methylene iodide, zinc-copper-methylene iodide (Simmons-Smith reagent) or zinc (granular or powdery)-acetoxy silver-methylene iodide, diazomethane-zinc halide such as diazomethane-zinc iodide, benzyl methyl mercury iodide and dialkyl methyl aluminum iodide. While the reaction is carried out in the presence or absence of a solvent, the use of a solvent is preferred so as to perform the reaction smoothly. The solvents to be used may preferably be, for example, ether such as diethyl ether or diisopropyl ether or hydrocarbon such as hexane, cyclohexane or benzene.

In the preparation of the starting materials having the aforementioned general formula (II), the configuration of the three-membered ring of the starting compound having the aforementioned general formula (II) is affected by the configuration of the compound having the aforementioned general formula (III). According to a large number of publications, the compound having the three-membered ring of α-configuration is generally obtained in case the hydroxyl group of α-configuration is employed. However, the physical constants enough for determining whether the compound obtained in reference examples providing examples of the preparation of the starting compounds has the three-membered ring of α-configuration or that of β-configuration have not been yet obtained. For this reason, in reference examples, the configurations of the three-membered ring of the compound having the general formula (II) which is obtained by using the compound having the aforementioned general formula (III) in which the hydroxyl group resides in α-configuration is described as α-configuration in accordance with a large number of the publications. In case where the desired compounds thus obtained are mixtures of optical isomers, these can be separated and resolved in a convenient synthesis step.

The present invention will be concretely illustrated by following examples and reference examples.

EXAMPLE 1

Methyl dl-13,14 α-methylene-15-oxoprostanoate

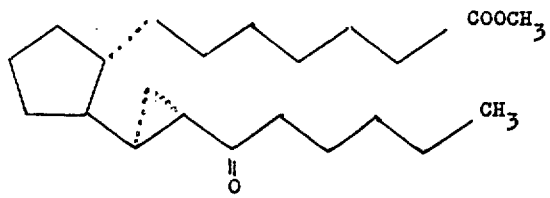

In 45 ml of anhydrous dichloromethane was dissolved 1.00 g of methyl dl-13,14 α-methylene-15 α-hydroxyprostanoate. To this solution was then added a mixture of 2.9 g of chromic anhydride, 4.62 ml of pyridine and 7.8 ml of dichloromethane under ice-cooling, and the mixture was stirred for 30 minutes. After completion of the reaction, 300 ml of ether was added to the reaction mixture, and the stirring was terminated. The reaction mixture was filtered through Celite (trade name) to remove inorganic substances. The ether layer was washed successively with a 2 % aqueous sodium hydroxide solution, water, 2 N aqueous hydrochloric acid, water, a 3 % aqueous sodium hydrogen carbonate solution and water, and dried over anhydrous sodium sulfate. After evaporation of the solvent from the ether layer, there was obtained 0.99 g of an oil. The oil thus obtained was purified by means of column chromatography using silica gel to give 0.85 g of the desired compound as an oil.

IR spectrum (liquid film) $\nu_{max}^{cm^{-1}}$:
1753 (ester), 1705 (ketone), 1038 (three-membered ring), No absorption to be assigned to a hydroxyl group was shown.

NMR spectrum (CDCl$_3$) δ : ppm. 3.7 (singlet, 3H, CH$_3$OCO—), 2.7–2.1 (quintet, 5H), 0.6 (multiplet, three-membered ring).

Mass spectrum M$^+$: 350.

EXAMPLE 2

Methyl dl-13,14 β-methylene-15-oxoprostanoate

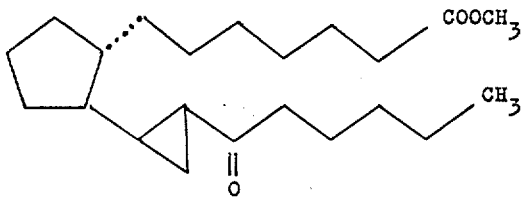

In 5 ml of anhydrous dichloromethane was dissolved 0.11 g of methyl dl-13,14 β-methylene-15 β-hydroxyprostanoate. To this solution was then added a mixture of 0.44 g of chromic anhydride, 0.7 ml of pyridine and 11.7 ml of dichloromethane under ice-cooling, and the mixture was stirred for 35 minutes. After completion of the reaction, the reaction mixture was then treated in the same manner as in example 1 to give 0.083 g of the desired compound as an oil.

IR spectrum (liquid film) $\nu_{max}^{cm^{-1}}$: 1750 (ester), 1700 (ketone), 1039 (three-membered ring), No absorption to be assigned to a hydroxyl group was shown.

NMR spectrum (CDCl$_3$) δ : ppm. 3.7 (singlet, 3H, CH$_3$OCO—), 2.7–2.1 (quintet, 5H), 0.7 (multiplet, three-membered ring).

Mass spectrum M$^+$: 350.

EXAMPLE 3 dl-13,14 α-Methylene-15-oxoprostanoic acid

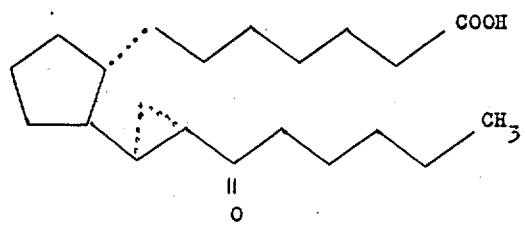

In 15 ml of amhydrous dichloromethane was dissolved 0.40 g of dl-13,14 α-methylene-15 α-hydroxyprostanol acid. To this solution was then added a mixture of 1.2 g of chromic anhydride, 1.9 ml of pyridine and 31 ml of dichloromethane, and the mixture was stirred at room temperature for 30 minutes. After completion of the reaction, ether was added to the reaction mixture, and the stirring was terminated. The reaction mixture was filtered through Celite (trade name) to remove inorganic substances. A 3 % aqueous sodium hydroxide solution was added to the resulting ether layer, and extraction was conducted. The aqueous layer was made acidic, and this solution was again extracted with ether. The extract was washed with water and dried. Upon evaporation of the solvent from the extract, there were obtained crude crystals. The crude crystals were recrystallized from ethyl acetate-n-hexane to give 0.28 g of the desired compound as white crystals, m.p. 29°–36°C.

IR spectrum (Nujol) $\nu_{max}^{cm^{-1}}$: 1707 (ketone, carboxylic acid), 1037 (three-membered ring).

NMR spectrum (CDCl$_3$) δ : ppm. 10.5 (br. singlet, 1H, —COOH), 2.7–2.1 (multiplet, 5H), -0.6 (multiplet, three-membered ring).

Mass spectrum M$^+$: 336.

EXAMPLE 4 dl-13,14 β-Methylene-15-oxoprostanoic acid

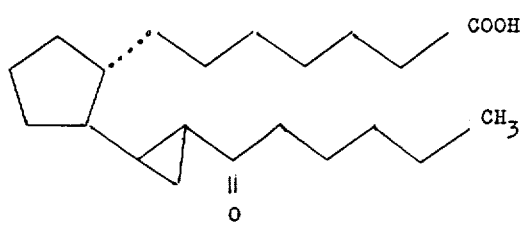

In 17 ml of anhydrous dichloromethane was dissolved 0.45 g of dl-13,14 β-methylene-15 β-hydroxyprostanoic acid. To this solution was added a mixture of 1.3 g of chromic anhydride, 2.1 ml of pyridine and 35 ml of dichloromethane, and the mixture was stirred at room temperature for 30 minutes. After completion of the reaction, the reaction mixture was then treated in the same manner as in exanple 3 to give 0.28 g of the desired compound as white crystals, m.p. 49.5°–51°C.

IR spectrum (Nujol) $\nu_{max}^{cm^{-1}}$: 1700 (carboxylic acid), 1032 (three-membered ring).

NMR spectrum (CDCl$_3$) δ : ppm. 11.0 (br. singlet, 1H, —COOH), 2.7–2.2 (multiplet, 5H), -0.7 (multiplet, three-membered ring).

Mass spectrum M$^+$: 336.

EXAMPLE 5

Potassium dl-13,14 α-methylene-15-oxoprostanoate

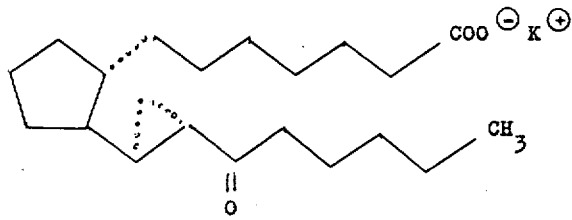

In 5 ml of 50 % aqueous methanol was dissolved 0.34 g of dl-13,14 α-methylene-15-oxoprostanoic acid. To this solution was added 0.10 g of potassium hydrogen carbonate, and the mixture was stirred at room temperature for 30 minutes. After completion of the reaction, the reaction mixture was concentrated to dryness with removing the solvent under reduced pressure. There was obtained 0.30 g of the desired compound as a white powder.

IR spectrum (Nujol) $\nu_{max}^{cm^{-1}}$: 1706 (ketone), 1580, 1410 (carboxylate).

Following reference examples 1 to 4 will illustrate the preparations of the starting materials.

REFERENCE EXAMPLE 1

Methyl dl-13,14 α-methylene-15 α-hydroxyprostanoate

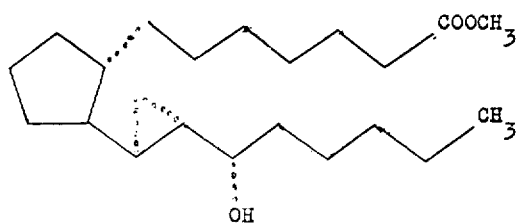

In 450 ml of anhydrous isopropyl ether was dissolved 3.38 g of methyl dl-15 α-hydroxyprost-13(trans)-enoate in a stream of argon. To this solution were added with stirring under ice-cooling 30 ml of n-hexane containing 25 % of diethyl zinc and 6 ml of methylene iodide, and the mixture was stirred at room temperature for 42 hours. After completion of the reaction, 40 ml of ether was added to the reaction mixture. Then 40 ml of a saturated aqueous potassium sodium tartrate solution and 0.5 ml of a saturated aqueous sodium hydrogen sulfite solution were added to the resulting mixture to decompose the unreacted zinc complex. After removing the organic layer, the aqueous layer was extracted twice with 20 ml of ether. The obtained ether layer and the aforementioned organic layer were combined. The combined solution was washed twice with 40 ml of a saturated aqueous sodium chloride solution and dried over anhydrous sodium sulfate. After completion of drying, the solvent was distilled off from the extract to leave 4.00 g of an oil. The obtained oil was purified by means of column chromatography using silica gel to yield 2.29 g of the desired compound as an oil.

IR spectrum (liquid film) $\nu_{max}^{cm^{-1}}$: 3450 (O—H), 1750 (ester), 1021 (three-membered ring).

NMR spectrum (CDCl$_3$) δ : ppm. 3.7 (singlet, 3H, CH$_3$OCO—), 2.9 (br. multiplet, 1H, 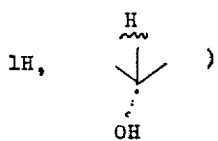 )

2.6–2.1 (triplet, 3H), -0.1 (multiplet, three-membered ring).

Mass spectrum (M$^+$+ TMS) − 1 : 423.

REFERENCE EXAMPLE 2

Methyl dl-13,14 β-methylene-15 β-hydroxyprostanoate

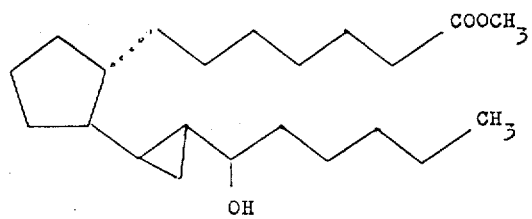

In 33 ml of anhydrous isopropyl ether was dissolved 0.338 g of methyl dl-15 β-hydroxyprost-13(trans)-enoate in a stream of argon. To this solution were added with stirring under ice-cooling 3.0 ml of n-hexane containing 25 % of diethyl zinc and 0.6 ml of methylene iodide, and the mixture was stirred at room temperature for 32 hours. After completion of the reaction, the reaction mixture was then treated in the same manner as in reference example 1 to give 0.156 g of the desired compound as an oil.

IR spectrum (liquid film) $\nu_{max}{}^{cm^{-1}}$: 3450 (O—H), 1750 (ester), 1028 (three-membered ring).

NMR spectrum (CDCl$_3$) δ : ppm. 3.7 (singlet, 3H, CH$_3$OCO—), 2.9 (br. multiplet,

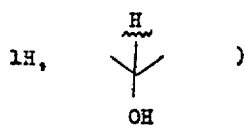

2.6–2.1 (triplet, 3H), 0.7–0.3 (br. doublet, 4H, three-membered ring).

Mass spectrum (M$^+$+ TMS) − 1 : 423.

REFERENCE EXAMPLE 3 dl-13,14 α-methylene-15 α-hydroxyprostanoic acid

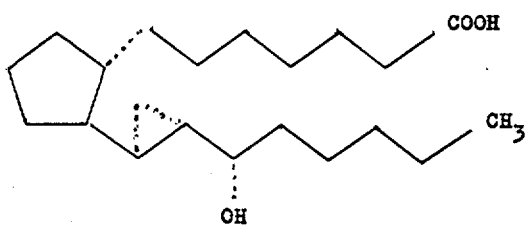

In 250 ml of anhydrous isopropyl ether was dissolved 1.62 g of dl-15 α-hydroxyprost-13(trans)-enoic acid in a stream of argon. To this solution were added with stirring under ice-cooling 20 ml of n-hexane containing 25 % of diethyl zinc and 4 ml of methylene iodide, and the mixture was stirred at room temperature for 72 hours. After completion of the reaction, the reaction mixture was then treated in the same manner as in reference example 1 to give 0.62 g of the desired compound as white crystals, m.p. 65°–66°C.

IR spectrum (Nujol) $\nu_{max}{}^{cm^{-1}}$: 3540, 3310 (O—H), 1710 (carboxylic acid), 1022 (three-membered ring).

NMR spectrum (CDCl$_3$) δ : ppm. 6.4 (br. singlet, 2H, —OH and —COOH) 2.9 (br. multiplet, 1H,

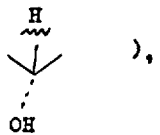

2.5–2.2 (triplet, 22H, —CH$_2$COOH), -0.2 (multiplet, three-membered ring).

Mass spectrum M$^+$− 18 : 320.

REFERENCE EXAMPLE 4 dl-13,14 β-Methylene-15 β-hydroxyprostanoic acid

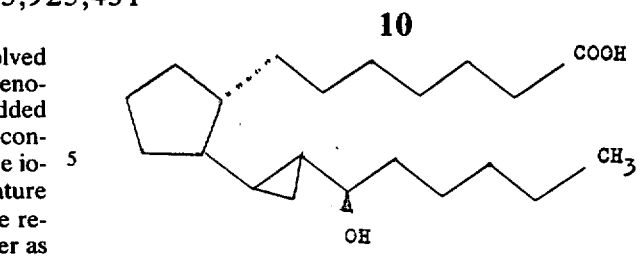

In 50 ml of anhydrous isopropyl ether was dissolved 0.32 g of dl-15 β-hydroxyprost-13(trans)-enoic acid. To this solution were added with stirring under ice-cooling 4 ml of n-hexane containing 25 % of diethyl zinc and 0.8 ml of methylene iodide, and the mixture was stirred at room temperature for 60 hours. After completion of the reaction, the reaction mixture was then treated in the same manner as in reference example 1 to give 0.081 g of the desired compound as white crystals, m.p. 51°–52°C.

IR spectrum (Nujol) $\nu_{max}{}^{cm^{-1}}$: 3270 (O—H), 1687 (carboxylic acid), 1028 (three-membered ring).

NMR spectrum (CDCl$_3$) δ : ppm. 10.5 (br. singlet, 1H, —COOH), 2.7–2.1 (multiplet, 5H), -0.6 (multiplet, three-membered ring)

Mass spectrum M$^+$− 18 : 320.

Then, reference examples 5 and 6 will illustrate the preparation of dl-13,14 α-methylene-15-oxoprostanoic acid from methyl dl-13,14 α-methylene-15-oxoprostanoate and the preparation of dl-13,14 β-methylene-15-oxoprostanoic acid from methyl dl-13,14 β-methylene-15-oxoprostanoate.

REFERENCE EXAMPLE 5 dl-13,14 α-methylene-15-oxoprostanoic acid

In 15 ml of tetrahydrofuran was dissolved 0.85 g of methyl dl-13,14 α-methylene-15-oxoprostanoate obtained in example 1. To this solution were added 8.5 ml of a 5 % aqueous sodium hydroxide solution and 8.5 ml of methanol, and the mixture was stirred at room temperature for 2 hours. After completion of the reaction, 6.5 ml of 2 N aqueous hydrochloric acid was added to the reaction mixture to make it acidic. Then the mixture was extracted with ethyl acetate. The extract was washed with a saturated aqueous sodium chloride solution and dried over anhydrous sodium sulfate. Upon evaporation of the solvent from the extract, there was obtained 0.65 g of the desired compound as white crystals.

The melting point, IR spectrum, NMR spectrum and Mass spectrum were identical with those of the compound obtained in example 1.

REFERENCE EXAMPLE 6 dl-13,14 β-Methylene-15-oxoprostanoic acid

The methyl dl-13,14 β-methylene-15-oxoprostanoate (0.083 g) obtained in example 2 was treated in the same manner as in reference example 5 to give 0.065 g of the desired compound as white crystals.

The melting point, IR spectrum, NMR spectrum and Mass spectrum were identical with those of the compound obtained in example 2.

What we claim is:

1. 13,14 ξ-Methylene-15-oxoprostanoic acid derivatives having the formula

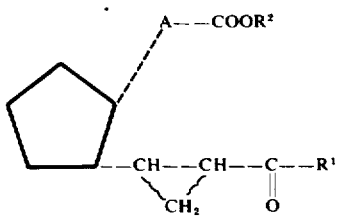

wherein A represents a straight or branched alkylene group having from 4 to 8 carbon atoms, R¹ represents a straight or branched alkyl group having from 4 to 10 carbon atoms and R² represents hydrogen atom or a straight or branched alkyl group having from one to 6 carbon atoms and pharmaceutically acceptable salts thereof.

2. 13,14 ξ-Methylene-15-oxoprostanoic acid derivatives having the formula

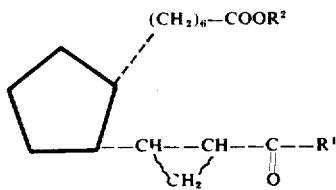

wherein R¹ represents a straight or branched alkylene group having from 4 to 10 carbon atoms and R² represents hydrogen atom or a straight or branched alkyl group having from one to 6 carbon atoms and pharmaceutically acceptable salts thereof.

3. 13,14 α(or β)-Methylene-15-oxoprostanoic acid.

4. Methyl 13,14 α(or β)-methylene-15-oxoprostanote.

5. Potassium 13,14 α(or β)-methylene-15-oxoprostanoate.

* * * * *

UNITED STATES PATENT OFFICE
CERTIFICATE OF CORRECTION

PATENT NO. : 3,925,451
DATED : December 9, 1975
INVENTOR(S) : KIYOSHI SAKAI et al It is certified that error appears in the above-identified patent and that said Letters Patent are hereby corrected as shown below:

1) Cover page, under "OTHER PUBLICATIONS", replace
   "Fieren et al" with --- Fieser et al ---.

2) Column 1, line 24, replace "carbom" with --- carbon ---.

3) Column 3, lines 1-10, replace the formula $$\text{"-CH-CH-R}^1\text{"} \quad \text{with} \quad --- \quad \text{-CH-CH-R}^1 \quad ---.$$
$$\underset{\text{OH}}{\|} \qquad\qquad\qquad \underset{\text{OH}}{\sim}$$

4) Column 6, line 55, replace "prostanol acid" with
   --- prostanoic acid ---.

5) Column 9, line 53, replace "-OH" with --- $-\underset{\sim}{OH}$ ---.

6) Column 9, line 62, replace "-CH$_2$COOH" with --- $-\underset{\sim}{C}H_2COOH$ ---.

7) Column 10, line 24, replace "-COOH" with --- $-COO\underset{\sim}{H}$ ---.

Signed and Sealed this eighteenth Day of May 1976

[SEAL]

Attest:

RUTH C. MASON
*Attesting Officer*

C. MARSHALL DANN
*Commissioner of Patents and Trademarks*